J. F. WHITE.
CUSHION TIRE FOR VEHICLES.
APPLICATION FILED MAR. 31, 1917.

1,245,413.

Patented Nov. 6, 1917.

WITNESSES:
B. E. Jenkins
G. Higgins

INVENTOR.
John F. White.
BY
ATTORNEY.

UNITED STATES PATENT OFFICE.

JOHN F. WHITE, OF PITTSBURGH, PENNSYLVANIA.

CUSHION-TIRE FOR VEHICLES.

1,245,413.

Specification of Letters Patent. Patented Nov. 6, 1917.

Application filed March 31, 1917. Serial No. 158,840.

*To all whom it may concern:*

Be it known that I, JOHN F. WHITE, a citizen of the United States of America, residing at Pittsburgh, county of Allegheny, and State of Pennsylvania, have invented certain new and useful Improvements in Cushion-Tires for Vehicles, of which the following is a specification.

This invention relates to cushion tires for vehicles, more particularly motor vehicles, and is an improvement upon the construction of cushion tire as set forth in Letters Patent 1,179,884 and 1,213,719 granted to me, and has for its object to provide a tire of such type which is simple in its construction and arrangement, strong, durable, efficient in its use, and comparatively inexpensive.

A further object of the invention is to provide a cushion tire, in a manner as hereinafter set forth, with a circumferential row of radially shiftable pressure equalizing elements set up relatively to each other and to the tire to overcome friction between said elements during traction.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1:
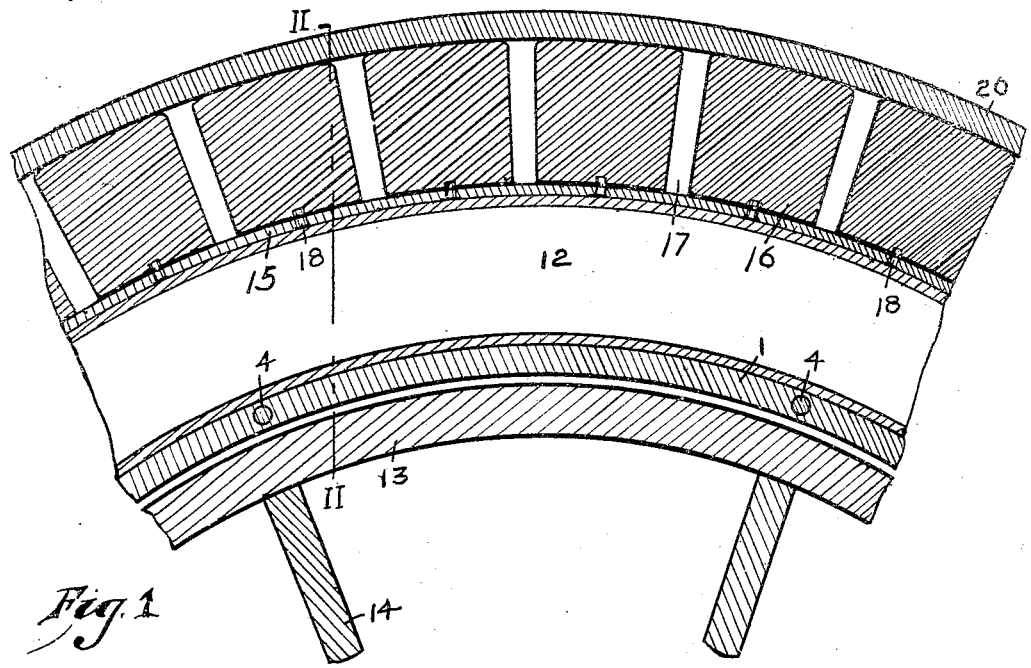
Figure 1 is an enlarged longitudinal sectional view through the tire and wheel rim.
Figure 2:
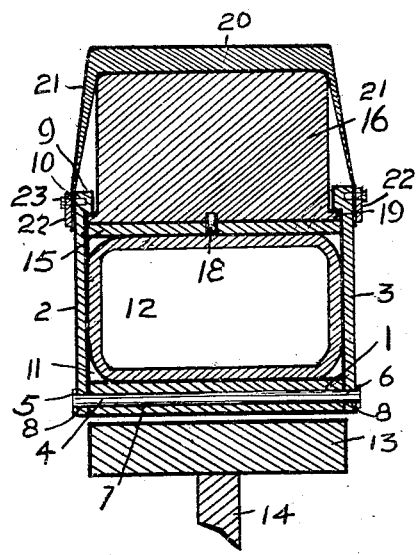
Fig. 2 is a cross sectional view of a tire on line II—II, Fig. 1.

A cushion tire in accordance with this invention includes an inner or cushion section, an intermediate or pressure equalizing section, and an outer or tread section.

The inner section consists of an annular member 1, a pair of annular plates 2, 3, which are positioned against the sides of the member 1 and detachably connected therewith by transverse bolts 4, provided at one end with heads 5, and at the other end with nuts 6. Openings 7 are arranged in the member 1 and which aline with openings 8 in the plates 2, 3, and through said alining openings extend the bolts 4.

The inner face of each of the plates 2, 3, at the outer end thereof, has an annular inset 9 forming a shoulder 10.

The member 1 in connection with the plates 2, 3, provide an annular channel 11, in which is seated a cushioning element 12, of a type similar to the inner tubes now employed in pneumatic tires. Suitable means can be employed for inflating the cushioning element 12.

The inner section of the tire is mounted upon the felly 13, to which is attached the spokes 14.

The intermediate section consists of an annular flexible member 15, which is mounted on the cushioning element 12, as well as providing a protector for said cushioning element 12. The annular member 15 is formed of textile material and has arranged circumferentially thereof a series of segment shape pressure equalizing elements 16, normally arranged in spaced relation as at 17. The pressure equalizing elements 16 are preferably constructed of wood, although hard rubber, or other suitable material may be employed, and each of said elements is secured to the outer face of the member 15 by rivets 18, these latter having their inner ends countersunk in the inner face of the member 15.

Each of the pressure equalizing elements 17, has its inner end provided with oppositely extending and laterally disposed flanges 19 which engage under the shoulders 10 whereby the outward movement of said intermediate section is arrested.

The outer or tread section consists of an outer shoe having a tread portion 20, which is oblong in transverse section, and which is seated upon the pressure equalizing elements 16. The outer shoe includes a pair of sides 21 which greatly decrease in thickness from the tread portion 20 to the inner end thereof and the said inner ends of said side portions 20 are positioned against the outer face of the plates 2, 3, and are connected with said plates 2, 3, by annular bands 22, which are maintained in position by securing devices 23, extending through the bands 22 and engaging in the plates 2, 3.

The sides 21 of the tread section act as a cover to prevent foreign substances engaging the pressure equalizing elements and also to prevent dirt or other objects entering the inner section.

The pressure equalizing elements 16 are solid and owing to the manner in which they are arranged, that is to say in spaced relation, during the compression caused by the load, the elements will not be brought together under such conditions overcoming any possible friction during the radial movement of said elements.

The plates 2, 3, as well as the member 15, reduce the possibility of puncture of the cushioning element 12, and said element 15, also prevents wear upon the cushioning element 12 during the shifting movement of the elements of the intermediate section.

When the tire is compressed, due to the load, the elements 16 move radially and to a position in close proximity to each other under such conditions closing the space 17, whereby the tread portion 20 will bear against a substantially solid surface due to the position of the elements 16.

The cushioning element 12 provides said inner section with what may be termed an air chamber.

What I claim is:

A tire for vehicles comprising a cushioning element, an annular member mounted thereon, a series of permanently spaced equalizing elements circumferentially arranged upon said member, means extending through said member and engaging in said equalizing elements for fixedly securing them to said member, and an outer section including a tread portion mounted upon the equalizing elements and further including side portions for inclosing said equalizing elements, supporting means for inclosing said cushioning element, and said equalizing elements and said supporting means having associated means to arrest outward shifting movement of said pressure equalizing elements, and means for securing the sides of said outer section to said supporting means.

In testimony whereof I affix my signature in the presence of two witnesses.

JOHN F. WHITE.

Witnesses:
 LUELLA H. SIMON,
 MAX H. SROLOVITZ.

Copies of this patent may be obtained for five cents each, by addressing the "Commissioner of Patents, Washington, D. C."